US 6,788,428 B1

(12) United States Patent
Shimokawa (10) Patent No.: US 6,788,428 B1
(45) Date of Patent: Sep. 7, 2004

(54) DATA PRINTING SYSTEM AND METHOD GENERATING INTERMEDIATE PRINTING DATA FOR ANOTHER APPLICATION TO CHANGE THE PRINTING DATA

(75) Inventor: Katsumi Shimokawa, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/549,061

(22) Filed: Apr. 13, 2000

(30) Foreign Application Priority Data

Apr. 13, 1999 (JP) .......................................... 11-104796

(51) Int. Cl.[7] .......................... G06F 15/00; G06F 13/00
(52) U.S. Cl. ................. 358/1.15; 358/1.18; 358/1.13; 709/321; 709/322; 709/323; 709/324; 709/325; 709/326; 709/327
(58) Field of Search ............................. 358/1.15, 1.18, 358/1.13; 709/321–327

(56) References Cited

U.S. PATENT DOCUMENTS 4,876,609 A * 10/1989 Ogura ........................ 358/443
6,426,798 B1 * 7/2002 Yeung ....................... 358/1.13
6,594,028 B1 * 7/2003 Hamamoto et al. ........ 358/1.15
2003/0218775 A1 * 11/2003 Udo et al. .................. 358/1.18

FOREIGN PATENT DOCUMENTS

EP          0915414       * 5/1999

* cited by examiner

Primary Examiner—Edward Coles
Assistant Examiner—Alan Rahimi
(74) Attorney, Agent, or Firm—Oblon, Spivak, McClelland, Maier & Neustadt, P.C.

(57) ABSTRACT

A system for printing data includes a printer to print the data and a terminal to process the data with a first application. The terminal includes an intermediate module operated under control of an operating system of the terminal; a communication processor communicating with the printer via an interface of the printer; and a printer driver activated by the application via the intermediate module to generate printing data of the data processed by the terminal and to cause the printer to print the data according to the printing data received by the printer. The printing driver is configured to generate an intermediate printing data before the data is tuned for an outputting size, and to allow a second application to access and change the intermediate printing data to an ultimate printing data and to cause the printer to print the data according to the ultimate printing data.

38 Claims, 4 Drawing Sheets

DATA PRINTING SYSTEM AND METHOD GENERATING INTERMEDIATE PRINTING DATA FOR ANOTHER APPLICATION TO CHANGE THE PRINTING DATA

BACKGROUND OF THE INVENTION

1. Field of the Invention

The present invention relates to a system and method of printing data from a terminal such as a personal computer and a workstation.

2. Discussion of the Background

When a user using a terminal equipment, such as a personal computer and a workstation (hereinafter referred to as a PC/WS), desires to print data, such as document or image data, which has been created or read from a file by manipulating a document editing/processing application, the user selects and executes the printing instruction of the document editing/processing application. Then, in response to the printing instruction, the document editing/processing application reads out a printer driver via an intermediate module such as a graphic user interface (GDI) under control of an operating system (OS) of the PC/WS. The printer driver converts the data to printing data using a page description language (PDL) that can be processed by the controller of a printer which is designated by the printing instruction. The printing data is then transferred to the printer controller via a spooler and through a network or a serial or parallel communication path. The printer controller processes the received printing data into bit-mapped image data for each page for printing, and then instructs the printer to print the data on a sheet.

The printing instruction of the document editing/processing application generally includes a standard setting for the printing condition for printing data. The user may further set additional printing conditions with the document editing/processing application or via the user interface the printer driver provides.

When the user does not need to print out the data immediately, instead of transferring the printing data to the printer for printing, the user may file the printing data in a storage device as a printing job file for printing later. The user reads out the printing job file from the storage device at his or her desired time to transfer the file to the spooler for printing the data with the printer.

Further, the user may integrate a plurality of printing job files thus stored in the storage device into one integrated printing job file and send the integrated printing job file to the printer for printing in one lot using a known printing application for managing and printing a plurality of printing job files. In this case, even when the plurality of printing jobs files are sent to the printer for printing in one lot with the printing application, the printing data of each printing job file includes the printing conditions specifically set for the job with the printing instructions of the document editing/processing application with which the printing data is generated. Therefore, the printer receiving the plurality of printing job files executes each printing job according to the printing conditions specifically set for the printing job.

When the user prints the plurality of printing job files in one lot with the printing application for printing a plurality of printing job files in one lot as described above, the user may desire to change some parts of the printing conditions set for each printing job individually for each printing job, or to change the printing conditions for each of the plurality of printing job files into one common printing condition.

Further, the user generally desires to view a print image of each printing job file on a display screen before printing to confirm the print image. Therefore, the PC/WS must have the application to process the PDL with which the printing data of each printing job file is written.

SUMMARY OF THE INVENTION

The present invention has been made in view of the above-discussed and other problems and addresses the above-discussed and other problems.

Preferred embodiments of the present invention provide a novel data printing system and method that allows a first application for processing a plurality of printing job files to process the data for printing and a second application to change the printing conditions individually for each printing job file or commonly for all of the printing job files.

The preferred embodiments further provide a novel data printing system and method that provides to the second application a print image of a specific printing job file designated by the second application.

According to a preferred embodiment of the present invention, a novel system for printing data includes a printer to print the data on a sheet and a terminal to process the data by a first application. The printer has an interface connecting to outside of the printer, and the terminal is connected to the printer via one of a directly connected cable, a network and a printer server. The terminal includes an intermediate module operated under control of an operating system of the terminal; a communication processor communicating with the printer via the interface of the printer; and a printer driver activated by the application via the intermediate module to generate printing data of the data processed by the terminal and to cause the printer to print the data according to the printing data received by the printer. The printing driver is configured to generate an intermediate printing data for the data before tuned for an outputting size for the data, and to allow a second application to access and change the intermediate printing data to an ultimate printing data and to cause the printer to print the data according to the ultimate printing data.

The printer driver may further be configured to generate a print image of the intermediate printing data and provide the print image to the second application.

The printer driver may be configured to include an application interface for the second application to access the intermediate printing data.

Further, the printer driver may be configured to allow the second application to inquire and obtain an answer about functions of the printer and setting parameters for each function of the printer.

Furthermore, the printer driver may be configured to provide to the second application the answer about the functions of the printer in a form of a characters row.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Figure 1:
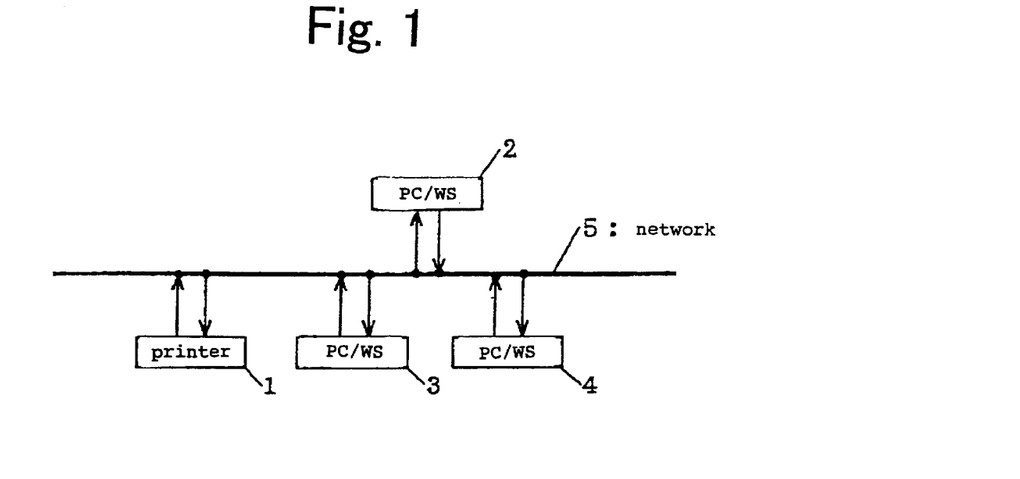
FIG. 1 is a block diagram illustrating a data printing system in which a data printing method according to the present invention is applied.

FIG. 1 is a block diagram illustrating a structure of a data printing system in which a method of printing data according to the present invention is applied. In FIG. 1, a printer 1 is a multi-function printer capable of performing scanning, printing and copying functions. Printer 1 may be performing only one printing function. PC/WSs 2, 3, 4 have various functions supported by an operating system (OS), including for example, a document editing/processing function. The printer 1 and the PC/WSs 2, 3, 4 are respectively connected to a network 5, such as a LAN. The printer 1 may be directly connected to the PC/WS 2, 3, or 4 via a dedicated cable or a standard cable such as a bi-directional parallel cable. In this case, the PC/WSs 2, 3, or 4 connected to the printer 1 serve as printer servers.

Figure 2:
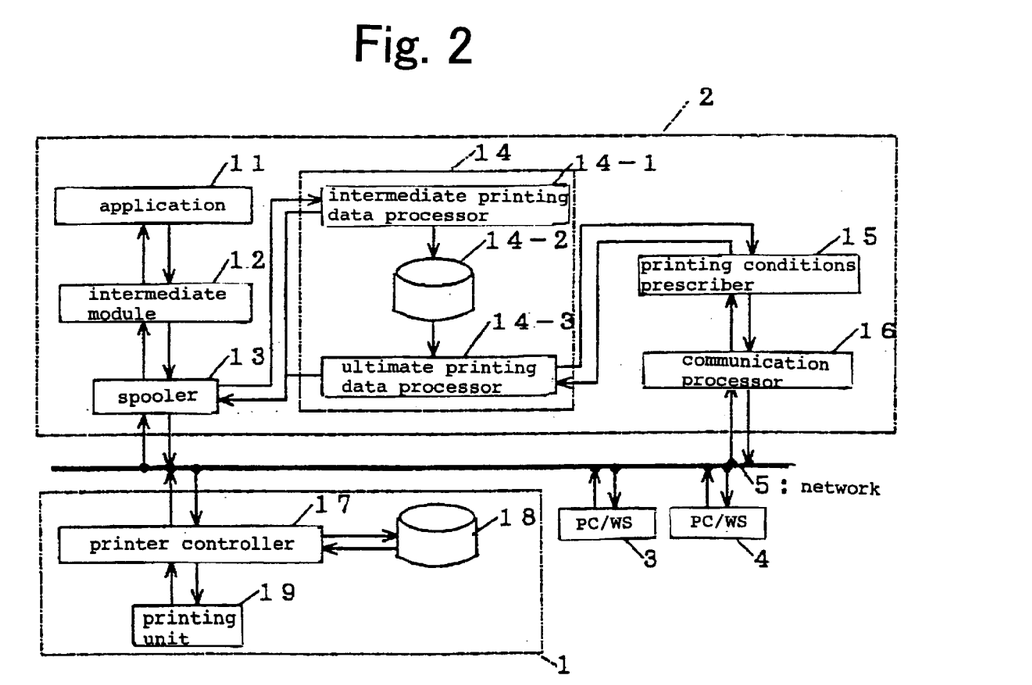
FIG. 2 is a block diagram illustrating a structure of the data printing system according to an embodiment of the present invention.

FIG. 2 is a block diagram illustrating a structure of the data printing system according to an embodiment of the present invention. The printer 1 includes a printer controller 17, a storage device 18 and a printing unit 19. The PC/WS 2, 3, 4 include an application 11, an intermediate module 12, a spooler 13, a printer driver 14, a printing conditions prescriber 15, and a communication processor 16. The printer driver 14 includes an intermediate printing data processor 14-1 and a printing data storage device 14-2 and an ultimate printing data processor 14-3. The PC/WSs 2, 3, 4 are connected to the printer 1 via the network 5. The application 11 is an application operable on the PC/WSs 2, 3, 4 and capable of a standard or dedicated printing operation, such as document editing/processing, paint processing and spread sheet applications. The intermediate module 12 is a graphic user interface (GDI) controlled under the OS, and reads out the printer driver 14 via the spooler 13 in response to the printing instruction of the document editing/processing application 11. The spooler 13 receives the data for printing from the intermediate module 12.

The printing driver 14 is configured to generate intermediate printing data for the data for printing, before tuned for an outputting size for the data, i.e., the printing data before editing for tuning the data for an outputting size, such as for example, conversion of the coordinates and reduction of the data for collectively printing a plurality of images in one page, or rotation of the image, is applied. The printer driver 14 is further configured to allow another i.e., a second, application to access the intermediate printing data to change the intermediate printing data to ultimate printing data and cause the printer 1 to print the data according to the ultimate printing data. For example, the second application may access the printer driver 14 to change a part of the intermediate printing data, relating to setting of the printing conditions for the data, and cause the printer 1 to print the data with the changed printing conditions. In the printer driver 14, the intermediate printing data processor 14-1 generates the intermediate printing data for the data for printing, which is then processed into the ultimate printing data for the data by the ultimate printing data processor 14-3 via the printing data storage device 14-2.

The printing condition prescriber 15 sets the printing condition for the data for printing. Further, the printing conditions prescriber 15 is configured to be accessed by the second application for an inquiry about the printing capability of the printer 1. Specifically, in response to the inquiry from the second application, the printing conditions prescriber 15 sends the inquiry to the printer controller 17 via the communication processor 16 and obtains the answer (the information about the capability of the printer 1) therefrom. The printing conditions prescriber 15 is further configured to send the information to the second application in the form that can be processed in the user interface of the second application. For example, the printing conditions prescriber 15 may send the information to the second application as the characters row representing the information that can be displayed in the user interface of the second application.

The communication processor 16 communicates with the printer controller 17 of the printer 1 via the network 5. The communicating processor 16 transmits the information from the printer controller 17 to the printing condition prescriber 15 of each PC/WS via the network 5. The communication processor 16 may store therein and manage the information received from the printer controller 17 for responding to the inquiry at high speed.

In the printer 1, the printer controller 17 receives the ultimate printing data from the spooler 13 and converts the printing data into bit-mapped image data for printing. The printer controller 17 may store the received printing data in the storage device 18 for subsequent printing. The printing unit 19 prints the data according to the bit-mapped image data on a sheet.

A serial or parallel communication path may be used instead of the network 5. Further, the printing conditions prescriber 15 may be provided within the printer driver 14 integrated with other components of the printer driver 14.

Next, an exemplary operation of printing data in the above-described data printing system according to the present invention is described.

It is assumed that the PC/WSs 2, 3, 4 and the printer 1 are operating normally. The user activates the application 11, such as a document editing/processing application, under control of the OS operable in the PC/WSs 2, 3, 4, and reads out and displays on a display screen data for printing, such as document or image data, by manipulation of the application 11. The user then selects the printing instruction (command) of the document editing/processing application 11, which generally includes a standard setting for the printing conditions for the data. The user may further add various optional settings for the printing conditions as necessary, and then executes the printing instruction. The optional printing conditions setting for the data are converted to the printing commands by the printer driver 14, and then sent to the printer 1. The printing data for the data is also generated by the printer driver 14 and is then sent to the printer 1. The order of transferring the printing commands and the printing data may be either way in which the printer controller 17 can receive the printing commands and data. The printer 1 then prints out the data on a sheet. In the above process of the operation, if a second application sets other printing conditions to the printing data via the printer driver 14 according to the present invention, the printer 1 prints the data according to the other printing conditions set by the second application.

Figure 3:
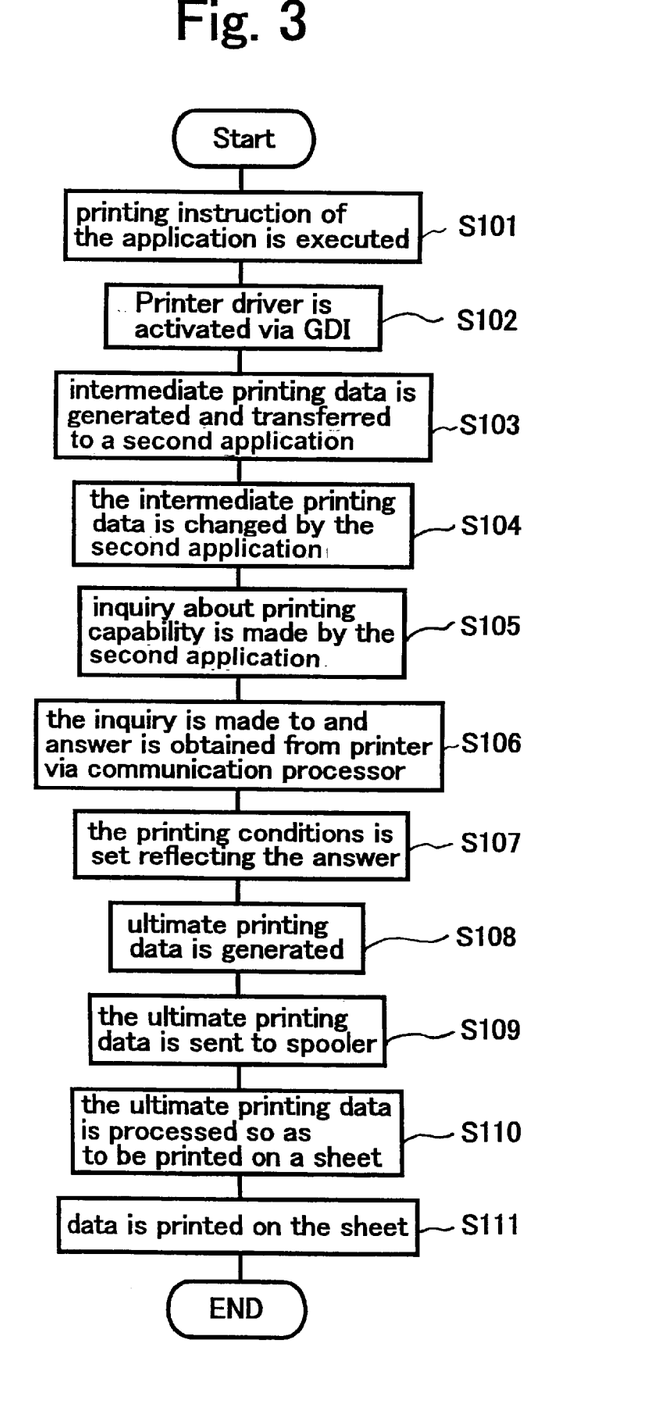
FIG. 3 is a flowchart illustrating an exemplary operation of printing data in the data printing system of FIG. 2, according to the present invention.

FIG. 3 is a flowchart illustrating the exemplary operation of printing data in the above-described data printing system according to the present invention.

In FIG. 3, in step S101, the printing instruction of the document editing/processing application is executed after designating edited or existing document data. Then, in step S102, the printer driver 14 is activated via the graphic data interface (GDI) functioning as the intermediate module 12. In step S103, the intermediate printing data before tuned for an outputting size for the data is generated by the printer driver 14. Further, the generated intermediate printing date is transferred to a second application, for example, a printing application for printing a plurality of printing jobs in one lot, according to an instruction which is pre-set by the user with the second application. When transferring the intermediate printing data to the second application, the data relating to setting of the printing conditions may be excluded, so that the second application can set a new printing condition. Further, the intermediate printing data may be stored in the intermediate printing data storage device 14-2 instead of being transferred to the second application so as to be accessed by the second application.

After receiving the intermediate printing data for the data as described above, in step S104, the intermediate printing data may be changed according to the instructions given by the user through the second printing application. For example, as described above, a part of the printing conditions in the intermediate printing data may be changed by the user.

In step S105, the second printing application may send an inquiry about the printing capability of the printer 1 to the printing condition prescriber 16 for determining if the printer 1 can print the data according to the printing conditions thus changed by the second application. In step S106, the printing condition prescriber 16 sends the inquiry to and obtains the answer from the printer controller 17 via the communication processor 16. For example, the second printing application may ask what functions are available at the printer 1, to which the printing conditions prescriber 15 may answer, for example, that the punching function is available. The second printing application may further ask what kind of punching parameters can be set for the punching function, to which the printing conditions prescriber 15 may answer, for example, that the position for punching may be designated for the left, right or no position.

Further, as described above, when the printing conditions prescriber 15 sends the answer of the inquiry to the second printing application, the printing conditions prescriber 15 may send the information in the form that can be processed in the user interface of the second printing application. For example, as the information representing the punching function, the characters row for the word PUNCH may be sent. Similarly, as the information representing the position for punching, the characters row for the words LEFT, RIGHT and NONE may be sent. Thus, a second application can receive the information about the printing capability of the printer 1 in the form that can be processed in the user interface of the second application. Therefore, the second application can program its own user interface for setting the printing conditions for the printer 1 without incorporating the information about the functions of the printer 1.

Having obtained the information about the printing capability of the printer 1, in step S107, the user may further change the setting of the printing conditions for the data according to the information, and then set the printing conditions thus changed with the second application at the printing conditions prescriber 15.

Table 1 shows examples of the inquiry commands and responses in the above-described inquiry and answer process. The inquiry commands and responses are represented by the characters rows as shown in the table 1, and the information is communicated as a file or a message. This is just an example, and the inquiry and answer process can be realized in any other manners.

TABLE 1

| Inquiry command | response |
| --- | --- |
| INQUIRE FUNC | FUNC = PUNCH |
|  | FUNC = STAPLE |
| INQUIRE PUNCH | PUNCH = NONE, LEFT, RIGHT |
| Set command | response |
| SET PUNCH = LEFT | SET PUNCH = LEFT |

In the above inquiry and answer process, the inquiry about the printing capability is made to the printing controller 17 via the communication processor 16. However, the inquiry can be directly made to the printer controller 17 without passing through the communication processor 16. Further, even when the printing conditions prescriber 15 is provided inside of the printer driver 14, the inquiry and answer process can be made substantially in the similar manner as described above.

In the above inquiry and answer process, the position of punching is set, for example, at the LEFT position in step S107. Then, in step S108, according to the printing request from the second application, the printer driver 14 generates the ultimate printing data for the data by applying necessary tuning to the data for the outputting size for the data, such as conversion of the coordinates and reduction of the image data for collectively printing a plurality of images in one page, or rotation of the data. When additional settings for the printing conditions are added to the intermediate printing data by the second application, the added printing conditions settings are properly merged with those of the intermediate printing data as generated by the printer driver 14.

In step S109, the ultimate printing data is sent to the spooler 13 so as to be sent to the printer controller 17. In step S110, the ultimate printing data is converted to the image information in a form that can be printed by the printer 1, and in step S111 the image information is printed on a sheet by the printer 1. In step S110, the ultimate printing data may be stored in the storage device 18 for printing later.

In the above-described operation of printing data, for example, the intermediate printing data may be generated by the printer driver 14 to include the data relating to the following;

1) the size of an original document, e.g., A3, A4 etc.
2) the direction of the original document, e.g., horizontal, portrait,
3) the resolution of the original document, e.g., 300 dpi, 400 dpi,
4) the details of the original document size, e.g., the width, the length, the effective printing width, the effective printing length, the offsetting width and length,
5) the image format
6) the image mode
7) the printing quality, e.g., the selection of color or black and white, the selection of a black and white printing mode (printing with C, M, Y, K, or with C, M, Y, or with K, or with R=G=B=K), the selection of a font outputting mode (with the font of the printer or according to the font conversion table), the font conversion table, the setting of color matching, black and white clarity, black and white density, color clarity, color contrast, color density, color tone, color balance, the number of bits for each color, the number of bits for black and white, the designation of a dither method, the designation of toner saving, the designation of smoothing, etc.

Further, the printing conditions relating to the following, for example, may be set with the second application after the inquiry and answer process with the printer driver 14;

1) the outputting size, e.g., the same as the original document size or the designated size with a necessary reduction of the image,
2) the outputting resolution,
3) the detail of the outputting size
4) collection of a plurality of image in one page
5) punching
6) stapling
7) stamping or putting a water mark
8) adding header, footer and page number
9) special treatment for a poster
10) finishing, e.g., putting a cover
11) changing the image size, e.g., enlarging, reducing
12) printing in the reversed order (printing the last page first)

As described above, in the data printing system according to the embodiment of the present invention, the printer driver 14 is configured to generate the intermediate printing data before tuned for an outputting size for the data. Further, the printer driver 14 is configured such that the intermediate printing data can be accessed by a second application. Therefore, the user can edit the data for printing itself, or change the printing conditions for the data with the second application.

Further, the printer driver 14 is configured such that the second application can inquire about the printing capability of the printer 1, e.g., the functions of the printer 1 and the setting parameters for each function, and obtain the information about the available printing capability via the printer driver 14. Therefore, the user can properly set the printing conditions for the data with the second application.

Further, the answer of the inquiry to the second printing application is made in the form that can be processed in the user interface of the second application, for example, in a form of the characters row representing the information of the received answer. Therefore, the user can program the user interface of the second application for setting the printing conditions for the printer 1 without incorporating the information about the functions of the printer 1.

Figure 4:
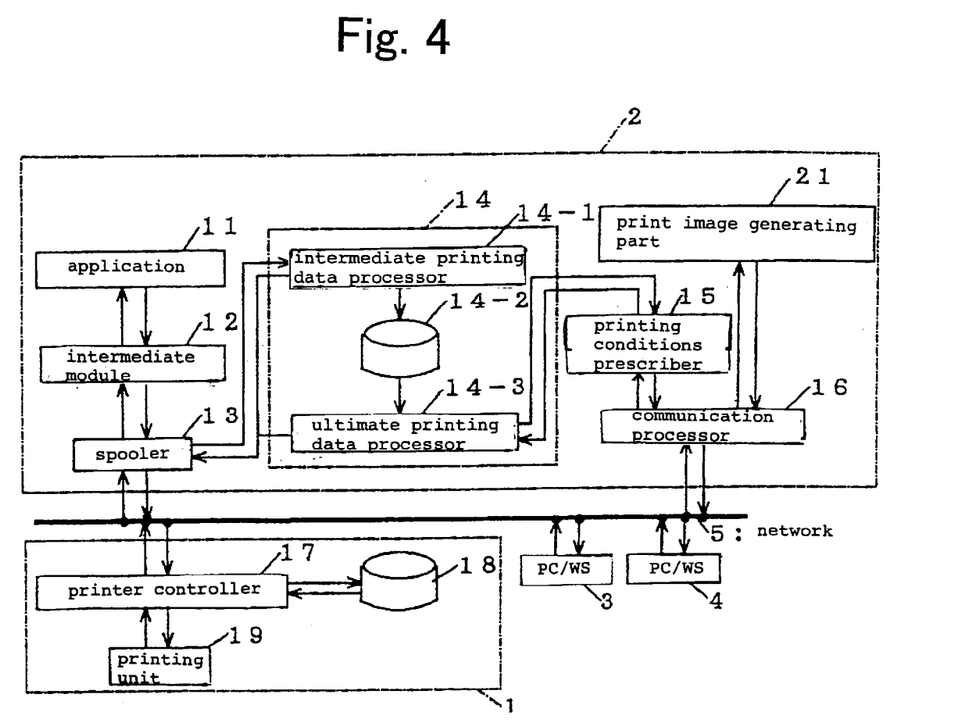
FIG. 4 is a block diagram illustrating a structure of the data printing system according to another embodiment of the present invention.

FIG. 4 is a block diagram illustrating a structure of the data printing system according to another embodiment of the present invention. The structure of the data printing system is substantially the same as that of the above-described embodiment illustrated in FIG. 2 except for the provision of a print image generating part 21, which generates a print image of the intermediate printing data generated by the printer driver 14. The print image generating part 21 may be provided within the printer driver 14, and further, may be integrated with the other components of the printer driver 14. A second application can access the print image generating part 21 to obtain the print image of the intermediate printing data for displaying the print image on the display screen with the second application before printing the data. Further, the second application may arrange and display on the display screen the print images of the intermediate printing data of each printing job file as thumbnail images of the file in various arrangement patterns.

Figure 5:
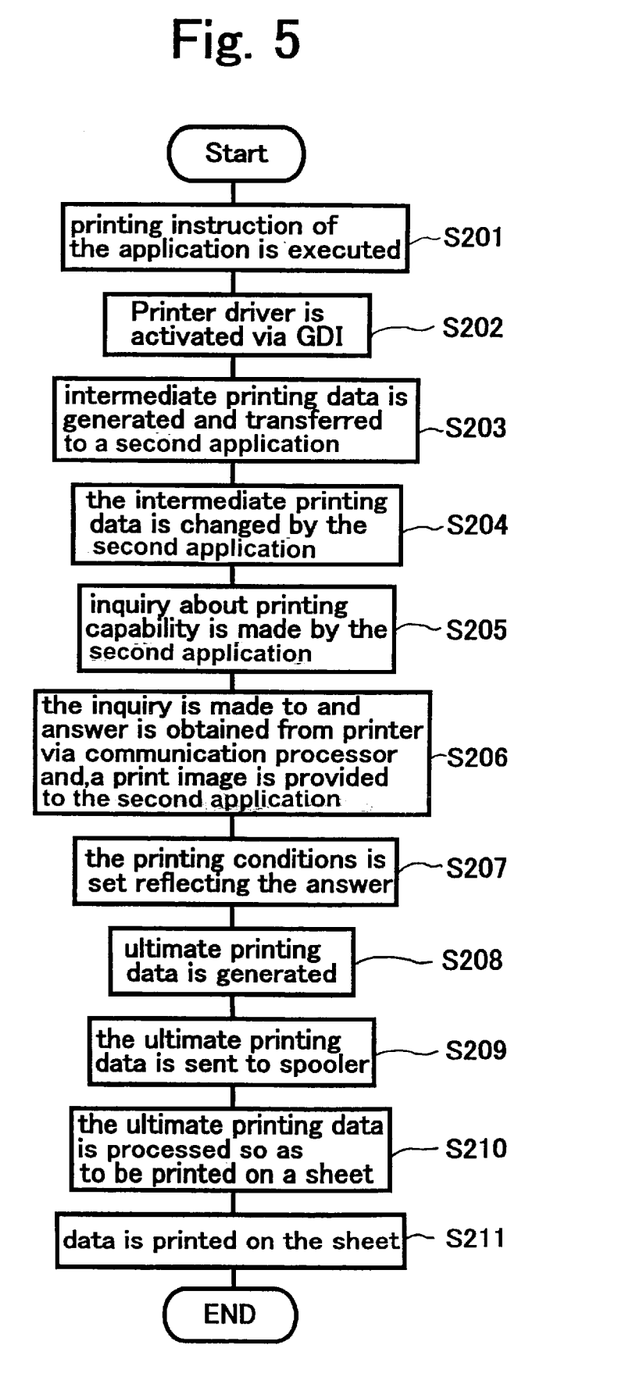
FIG. 5 is a flowchart illustrating an exemplary operation of printing data in the data printing system of FIG. 4, according to the present invention.

FIG. 5 is a flowchart illustrating an exemplary operation of printing data in the data printing system of FIG. 4. The operation is substantially the same as that of the data printing system of FIG. 2, which is illustrated in FIG. 3, except for step S206, in which a print image of the intermediate print data for the data, which is changed by a second application, is generated and provided to the second application.

The print image can be generated in various manners. For example, the print image can be generated 1) after decreasing the resolution of the image, so that the size of the image data is reduced. In this case, the print image can be used as the thumbnail image for the data, and the second application may arrange the thumbnail images of each printing job file on the display screen for viewing the print images of the file. Further, the print image can be generated after; 2) reducing the number of colors to reduce the size of the image data; 3) converting a color image into a black-and-white image to reduce the size of the image data; 4) converting a positive image into a negative image or vice versa; 5) overlaying a form on an image; 6) putting a water mark in an image; 7) adding a page header and a page footer; 8) converting the colors (e.g., the colors of the character part to black, or adjusting the colors such as density and tone; 9) inverting the right and left of an image (i.e., after generating the mirror image of an image); or 10) collectively reducing a plurality of images and arranging the reduced images in a matrix form in one page.

As described above, the printer driver 14 provides a print image of the intermediate printing data which is generated by the printer driver 14. Therefore, when a second application changes, for example, the printing conditions of the intermediate printing data by accessing the intermediate printing data via the printer driver 14, the print image of the intermediate printing data after having been changed by the second application can be displayed on the display screen with the second application. Further, the print image generated after reducing the resolution, for example, may be used as the thumbnail image of the intermediate printing data. Such thumbnail images can be arranged in various patterns for displaying on the display screen, such that the user can easily confirm the print images of each printing job file with the second application.

The mechanism and processes set forth in the present description may be implemented using a conventional general purpose microprocessor programmed according to the teachings in the present specification, as will be appreciated to those skilled in the relevant art(s). Appropriate software coding can be readily prepared by skilled programmers based on the teachings of the present disclosure, as will also be apparent to those skilled in the relevant art(s).

The present invention thus also includes a computer program product which may be hosted on a storage medium and include instructions which can be used to program a microprocessor to perform a process in accordance with the present invention. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No.

11-104796 filed in the Japanese Patent Office on Apr. 13, 1999, and the entire content of which is hereby incorporated by reference.

What is claimed is:

1. A system for printing data, comprising:
    a printer configured to print the data and having an interface connecting to outside of the printer; and
    a terminal configured to process the data with a first application, said terminal being connected to the printer and comprising:
        an intermediate module operated under control of an operating system of the terminal,
        a communication processor configured to communicate with the printer via the interface of the printer, and
        a printer driver activated by the first application via the intermediate module to generate printing data of the data processed by the terminal and to cause the printer to print the data according to the printing data received by the printer,
    wherein the printer driver is configured to generate an intermediate printing data before the data is tuned for an outputting size, and to allow a second application to access and change the intermediate printing data to an ultimate printing data and to cause the printer to print the data according to the ultimate printing data,
    wherein said second application inquires and obtains an answer about functions of the printer when accessing said printer; and
    wherein said printer driver changes to the ultimate printing data in accordance with the functions of the printer.

2. A system according to claim 1, wherein the printer driver is configured to generate a print image of the intermediate printing data and provide the print image to the second application.

3. A system according to claim 1, wherein the printer driver further comprises an application interface for the second application to access the intermediate printing data.

4. A system according to claim 1, wherein the printer driver is configured to allow the second application to inquire and obtain an answer about setting parameters for each function of the printer.

5. A system according to claim 1, wherein the printer driver is configured to provide to the second application the answer about the functions of the printer in a form of a characters row.

6. A system according to claim 2, wherein the printer driver is configured to provide the print image to the second application after a resolution of the print image is decreased.

7. A system according to claim 2, wherein the printer driver is configured to provide the print image to the second application after a number of colors of the print image is decreased.

8. A system according to claim 2, wherein the printer driver is configured to provide the print image to the second application after converting a color image to a black-and-white image.

9. A system according to claim 2, wherein the printer driver is configured to provide the print image to the second application after converting a positive image into a negative image.

10. A system according to claim 2, wherein the printer driver is configured to provide the print image to the second application after converting a negative image into a positive image.

11. A system according to claim 2, wherein the printer driver is configured to provide the print image to the second application after overlaying a form on an image.

12. A system according to claim 2, wherein the printer driver is configured to provide the print image to the second application after putting a water mark in an image.

13. A system according to claim 2, wherein the printer driver is configured to provide the print image to the second application after adding a page header and a page footer.

14. A system according to claim 2, wherein the printer driver is configured to provide the print image to the second application after converting colors.

15. A system according to claim 2, wherein the printer driver is configured to provide the print image to the second application after inverting right and left sides of an image.

16. A system according to claim 2, wherein the printer driver is configured to provide the print image to the second application after collectively reducing a plurality of images and arranging the reduced images in a matrix in one page.

17. A terminal for processing data with a first application, comprising:
    an intermediate module operated under control of an operating system of the terminal;
    a communication processor configured to communicate with a printer; and
    a printer driver activated by the first application via the intermediate module to generate printing data of the data processed by the terminal and to cause the printer to print the data according to the printing data received by the printer,
    wherein the printer driver is configured to generate an intermediate printing data before the data is tuned for an outputting size, and to allow a second application to access and change the intermediate printing data to an ultimate printing data and to cause the printer to print the data according to the ultimate printing data,
    wherein said second application inquires and obtains an answer about functions of the printer when accessing said printer; and
    said printer driver changes to the ultimate printing data in accordance with the functions of the printer.

18. A terminal according to claim 17, wherein the printer driver is configured to generate a print image of the intermediate printing data and to provide the print image to the second application.

19. A terminal according to claim 17, wherein the printer driver further comprises an application interface for the second application to access the intermediate printing data.

20. A terminal according to claim 17, wherein the printer driver is configured to allow the second application to inquire and obtain an answer about setting parameters for each function of the printer.

21. A terminal according to claim 17, wherein the printer driver is configured to provide to the second application the answer about the functions of the printer in a form of a characters row.

22. A printer for printing data, connected to a terminal configured to process the data with a first application, the printer comprising:
    an intermediate module operated under control of an operating system of the printer;
    a communication processor configured to communicate with the terminal; and
    a printer driver activated by the first application of the terminal via the intermediate module to generate printing data of the data processed by the terminal and to cause the printer to print the data according to the printing data received by the printer,
    wherein the printer driver is configured to generate an intermediate printing data before the data is tuned for an outputting size, and to allow a second application to access and change the intermediate printing data to an ultimate printing data and to cause the printer to print the data according to the ultimate printing data, wherein said second application inquires and obtains an answer about functions of the printer when accessing said printer; and said printer driver changes to the ultimate printing data in accordance with the functions of the printer.

23. A printer according to claim 22, wherein the printer driver is configured to generate a print image of the intermediate printing data and provide the print image to the second application.

24. A printer according to claim 22, wherein the printer driver further comprises an application interface for the second application to access the intermediate printing data.

25. A printer according to claim 22, wherein the printer driver is configured to allow the second application to inquire and obtain an answer about setting parameters for each function of the printer.

26. A printer according to claim 22, wherein the printer driver is configured to provide to the second application the answer about the functions of the printer in a form of a characters row.

27. A method of printing data with a printer, comprising the steps of:

processing the data with a first application;

generating an intermediate printing data before the data is tuned for an outputting size;

inquiring and obtaining an answer about functions of the printer with a second application accessing said printer;

changing the intermediate printing data to an ultimate printing data in accordance with said functions of the printer;

tuning the data for the outputting size according to the ultimate printing data; and printing the data according to the ultimate printing data.

28. A method according to claim 27, further comprising the step of:

generating a print image of the intermediate printing data and providing the print image to the second application.

29. A method according to claim 28, further comprising the step of:

inquiring and obtaining an answer about setting parameters for each function of the printer with the second application.

30. A method of printing data with a printer, comprising the steps of:

processing the data with a first application;

generating an intermediate printing data before the data is tuned for an outputting size with a printer driver;

inquiring and obtaining an answer about functions of the printer with a second application accessing said printer;

transferring the intermediate printing data to said second application;

changing with the second application the intermediate printing data into an ultimate printing data in accordance with said functions of the printer;

receiving the ultimate printing data from the second application and tuning the data for an outputting size according to the ultimate printing data with the printer driver; and printing the data according to the ultimate printing data.

31. A method according to claim 30, further comprising the step of:

generating a print image of the intermediate printing data with the printer driver and providing the print image to the second application.

32. A method according to claim 30, further comprising the step of:

inquiring and obtaining an answer about setting parameters for the each function of the printer with the another application.

33. A computer program product, comprising:

a computer storage medium and a computer program code mechanism embedded in the computer storage medium for causing a computer to control printing of data, the computer program code mechanism comprising:

a first computer code device configured to process the data with a first application;

a second computer code device configured to generate an intermediate printing data before the data is tuned for an outputting size;

a third computer code device configured to inquire and obtain an answer about functions of the printer with a second application and to change the intermediate printing data to an ultimate printing data in accordance with said functions of the printer with said second application;

a fourth computer code device configured to tune the data for an outputting size according to the ultimate printing data; and a fifth computer code device configured to print the data according to the ultimate printing data.

34. A computer program product according to claim 33, the computer program code mechanism further comprising:

a sixth computer code device configured to generate a print image of the intermediate printing data and to provide the print image to the second application.

35. A computer program product according to claim 33, the computer program code mechanism further comprising:

a sixth computer code device configured to inquire and obtain an answer about setting parameters for each function of the printer with the second application.

36. A computer program product, comprising:

a computer storage medium and a computer program code mechanism embedded in the computer storage medium for causing a computer to control printing of data, the computer program code mechanism comprising:

a first computer code device configured to process the data with a first application;

a second computer code device configured to generate an intermediate printing data before the data is tuned for an outputting size, with a printer driver;

a third computer code device configured to transfer the intermediate printing data to a second application, to inquire and obtain an answer about functions of the printer, and to change the intermediate printing data by the second application into an ultimate printing data in accordance with said functions of the printer;

a fourth computer code device configured to receive the ultimate printing data from the second application and tuning the data for the outputting size according to the ultimate printing data with the printer driver; and a fifth computer code device configured to print the data according to the ultimate printing data.

37. A computer program product according to claim 36, the computer program code mechanism further comprising:

a sixth computer code device configured to generate a print image of the intermediate printing data and to provide the print image to the second application.

38. A computer program product according to claim 36, the computer program code mechanism further comprising:

a sixth computer code device configured to inquire and obtain an answer about setting parameters for each function of the printer with the second application.

* * * * *